(12) United States Patent
Ohara et al.

(10) Patent No.: US 6,723,925 B2
(45) Date of Patent: Apr. 20, 2004

(54) FLAT CABLE AND LAMINATED CABLE HARNESS

(75) Inventors: Mitsutaka Ohara, Tokyo (JP); Hajime Watanabe, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/304,621

(22) Filed: Nov. 26, 2002

(65) Prior Publication Data

US 2003/0102148 A1 Jun. 5, 2003

(30) Foreign Application Priority Data

Dec. 3, 2001 (JP) ......................................... 2001-368622

(51) Int. Cl.$^7$ ................................................. H01B 7/00
(52) U.S. Cl. ............................... 174/113 R; 174/117 F; 174/117 FF; 174/72 A
(58) Field of Search ........................ 174/110 R, 113 R, 174/117 R, 117 F, 117 FF, 69, 71 R, 72 A

(56) References Cited

U.S. PATENT DOCUMENTS

| | | | | |
|---|---|---|---|---|
| 3,700,786 A | * | 10/1972 | Lawrenson | 174/72 A |
| 3,818,122 A | * | 6/1974 | Luetzow | 174/86 |
| 3,878,341 A | * | 4/1975 | Balde | 307/113 |
| 4,065,199 A | * | 12/1977 | Andre et al. | 439/498 |
| 4,283,593 A | * | 8/1981 | Piasecki et al. | 174/36 |
| 4,319,075 A | * | 3/1982 | Willette | 174/117 FF |
| 4,429,939 A | * | 2/1984 | Piasecki | 439/442 |
| 4,845,315 A | * | 7/1989 | Stopper | 361/827 |
| 4,898,544 A | * | 2/1990 | Callahan | 439/498 |
| 5,219,928 A | * | 6/1993 | Stofko et al. | 525/57 |
| 5,651,694 A | * | 7/1997 | Miyasaka et al. | 439/492 |
| 5,789,710 A | * | 8/1998 | Vanderpoel | 174/72 A |
| 6,538,205 B2 | * | 3/2003 | Ueno | 174/117 F |

* cited by examiner

Primary Examiner—William H. Mayo, III
(74) Attorney, Agent, or Firm—Cohen, Pontani, Lieberman & Pavane

(57) ABSTRACT

A flat cable includes a strip having lead wires therein, and projecting portions formed on the strip as branch joints and projecting in the width direction of the strip. The branch joint allows a connection between the lead wires or between the lead wire and an electric connection line. A laminated cable harness includes the flat cables laminated one on top of the other, and connecting terminals or wires for electrically connecting between the lead wire of one flat cable and the lead wire of the other flat cable so that the branch joint is completed.

10 Claims, 11 Drawing Sheets

FLAT CABLE AND LAMINATED CABLE HARNESS

CROSS-REFERENCE TO RELATED APPLICATION

This application claims priority from Japanese Patent Application No. 2001-368622 which is incorporated herein by reference.

BACKGROUND OF THE INVENTION

1. Field of the Invention

The present invention relates to a flat cable and a laminated cable harness.

2. Description of the Art

Electric appliances for a vehicle, such as an automobile, include safety appliances, auxiliary appliances and so on. In recent years, these electric appliances have been increasing in function and in variety. At the same time, electric wiring connected to such electric appliances has become more complicated and higher in density.

A wire harness used for the electric wiring within an automobile includes a lot of cables. In fact, the number of cables in a wire harness varies depending upon the models and the classes of automobiles, and the total number of cables sometimes reaches up to 500, even to 800. If the number of cables bound or tied together within the wire harness is increased, the wire harness becomes large in the diameter thereof, thereby increasing the volume occupied by that wire harness. Thus, at the same time, a tact time (cycle time) necessary for tying up the cables as a wire harness becomes long when manufacturing a vehicle, thereby increasing the manufacturing cost of the wire harness.

Under the situation described above, there is a tendency to use a flat cable or a laminated cable harness in place of the wire harness. The flat cable contains flat lead wires embedded in a tape-shaped insulating sheath. The laminated cable harness is prepared by laminating a plurality of flat cables. Thus, the flat cable and cable harness have flexibility.

However, since the lead wires of the flat cable have covered together with the insulating sheath, it is not easy to make connection between each of the lead wires and an electrical connection line at an arbitrary position of the flat cable, different from the case of the wire harness. In other word, a branch connection of the flat cable cannot be performed easily.

To describe more specifically, in the case of the laminated cable harness, it is actually impossible to make such branch connection between one flat cable and the other flat cable, when another flat cable lies between those flat cables under the state that such branch connection is required.

To enable such branch connection as described above, it is necessary to provide junction equipment, such as a joint connector or a joint box. However, using such equipment not only makes the electric wiring within a vehicle more complicated, but also increases the length needed for the flat cable or the laminated cable harness.

OBJECT AND SUMMARY OF THE INVENTION

It is an object of the present invention to provide a flat cable and a laminated cable harness obtained by laminating the flat cables for achieving reduction of the use of junction equipment and miniaturization of the electric wiring described above, namely a flat cable and a laminated cable harness for connecting and/or branching off lead wires thereof as desired and with ease.

To achieve the object described above, according to the present invention, there is provided a flat cable comprising a flat strip, including a plurality of lead wires extended in parallel with each other along the strip, and an insulating sheath for covering around the lead wires; and a lap section formed on the middle of the strip as a branch joint, said branch joint allowing one of connections between the lead wires and between the lead wire and an electric connection line, wherein the lap section is formed by folding the strip so as to lie one of adjacent two portions of the strip upon the other portion and projects in a width direction of the strip while being parallel with a remaining portion of the strip.

Further, to achieve the object described above, according to the present invention, there is provided a laminated cable harness comprising a plurality of flat cables laminated with one on top of the other, each of the flat cables includes: a flat strip having a plurality of lead wires extended in parallel with each other along the strip, and an insulting sheath covering the lead wires; and a lap section as a branch joint, formed on the middle of the strip, the branch joint allowing one of connections between the lead wires and between the lead wire and an electric connection line, wherein the lap section is formed by folding the strip so as to lie one of adjacent two portions of the strip upon the other portion and projects in a width direction of the strip while being parallel with a remaining portion of the strip, and the lap sections of the flat cables are located in tandem along a longitudinal direction of the laminated cable harness; and connecting member for being adapted to complet the branch joint.

BRIEF DESCRIPTION OF THE DRAWINGS

The present invention will become more fully understood from the detailed description given hereinbelow and the accompanying drawings, which are given by way of illustration only, and thus, are not limitative of the present invention, and wherein.

DETAILED DESCRIPTION OF THE INVENTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of whish is solely responsible for its desirable attributes or which is essential to practicing the invention herein descried.

Figure 1:
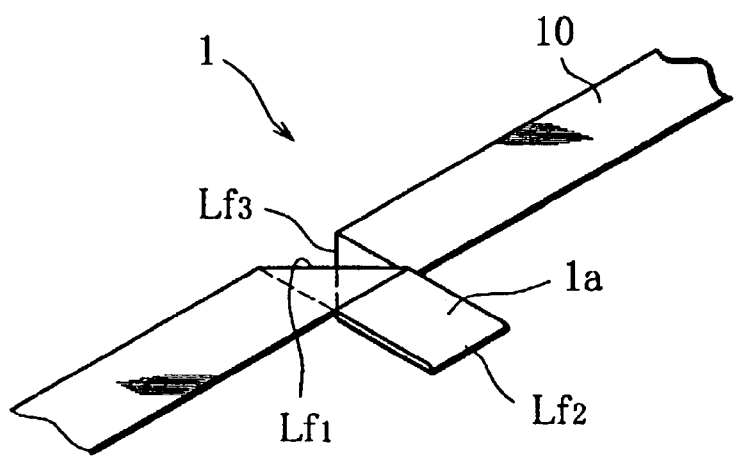
FIG. 1 is a perspective view showing a flat cable with a projecting portion according to an embodiment of the present invention.

FIG. 1 shows a flat cable 1 according to the present invention. As shown in FIG. 1, the flat cable 1 includes a main part 10 extending straight in one direction, and a lap section or projecting section 1a. The projecting portion 1a is located at a predetermined position of the main part 10 and projects in the width direction thereof. The projecting portion 1a is provided for making connection and/or branch-off of lead wires embedded in the flat cable 1 or the main part 10 easily and as desired.

Figure 2:
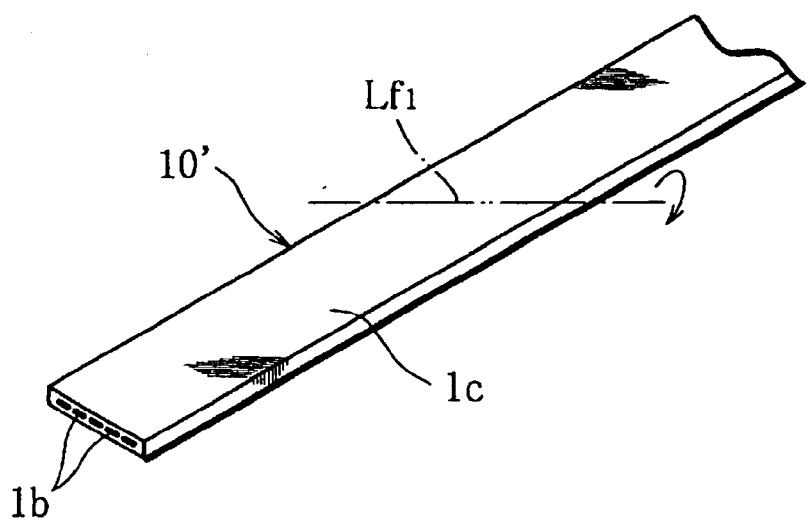
FIGS. 2 to 4 show a folding procedure for forming the flat cable of FIG. 1 from a flat strip in order.

The flat cable 1 is obtained by folding a flat strip 10' shown in FIG. 2.

As shown in FIG. 2, the strip 10' has a straight and flat configuration. The strip 10' includes a plurality of flat lead wires 1b (5 pieces in FIG. 2), extended in parallel, and an insulating synthetic resin or electrically insulating sheath 1c. The sheath 1c covers those lead wires 1b so as to insulate the lead wires 1b from each other. The strip 10' has flexibility due to the synthetic resin of the sheath 1c.

Figure 3:
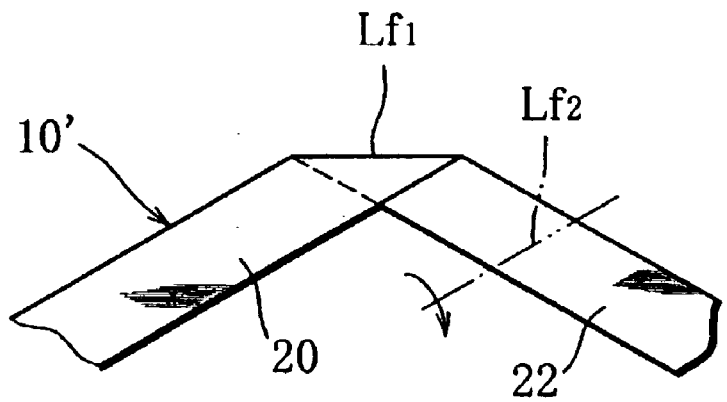

First, the strip 10' is folded along a folding line Lf1 as shown in FIG. 2 in two parts 20 and 22. As shown in FIG. 3, these parts 20 and 22 are at approximately a right angle to each other. Thus, the folding line Lf1 is defined at a predetermined position of the strip 10' and an angle of approximately 45° with respect to the longitudinal direction thereof.

Figure 4:
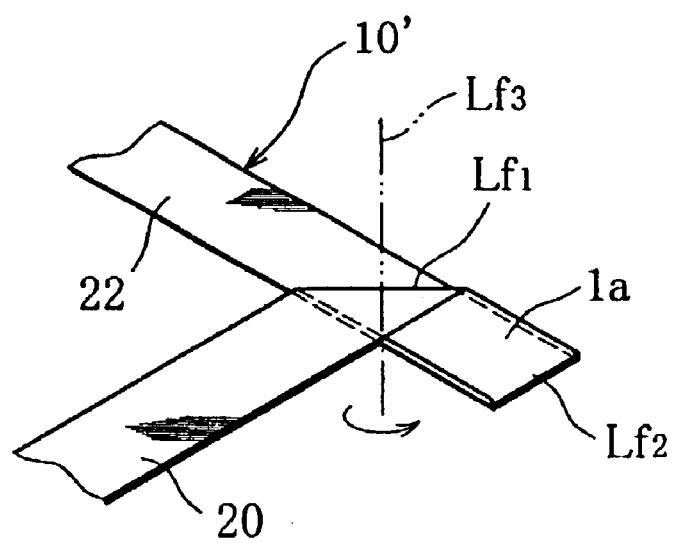

Next, as shown in FIG. 4, the part 22 of the strip 10' is folded back by an angle of 180° along a folding line Lf2 which defined at a predetermined position of the part 22 and is a right angle to the longitudinal direction thereof.

Further, the part 22 is folded along a folding line Lf3 as shown in FIG. 4. The folding line Lf3 is substantially orthogonal to the folding line Lf1, thereby obtaining the flat cable 1 as shown in FIG. 1, in which the projecting portion 1a projects in the width direction of the main part 10 of the flat cable 1. In this case, the folding line Lf3 is at an angle of approximately 45° with respect to the longitudinal direction of the main part 10.

The projecting portion 1a projects in the width direction of the flat cable 1, but it is not limited thereto. The configuration of the projecting portion 1a can be changed depending upon the purpose, the use, etc., of the flat cable 1.

Therefore, also the order of folding the strip 10' for forming the flat cable 1 with the projecting portion 1a, the locations of the folding lines on the strip 10', and the angles of the folding lines with respect to the longitudinal direction of the strip 10' are not limited to the folding procedure described above, by referring to FIGS. 2 to 4 and FIG. 1.

Now, the flat cable 1 with the projecting portion 1a as described above can be formed by means of an automatic processing machine. The machine performs the folding procedure in accordance with the order shown in FIGS. 3, 4 and 1. However, it is physically impossible to process the strip 10' by means of the automatic processing machine when the strip 10' becomes long to a certain length. That is, the strip 10' is necessary to be folded along the folding lines Lf1 and turned by 90°, and then to be folded along the folding line Lf3 and further turned by 90°. Therefore, a large space must be kept around the automatic processing machine for enabling that changes of direction of the strip 10'. Because there is a limit in expansion of the working space for forming the flat cable 1 with the projecting portion 1a within the automatic processing machine, the length of the flat cable 1 in the length direction has an upper limit as a matter of course.

Explanation will be given of a folding procedure for the flat cable 1, for avoiding such spatial difficulty on the automatic processing machine with reference to FIGS. 5 to 8. That is, the folding procedure is basically independent of the length of the flat cable 1.

Figure 5:
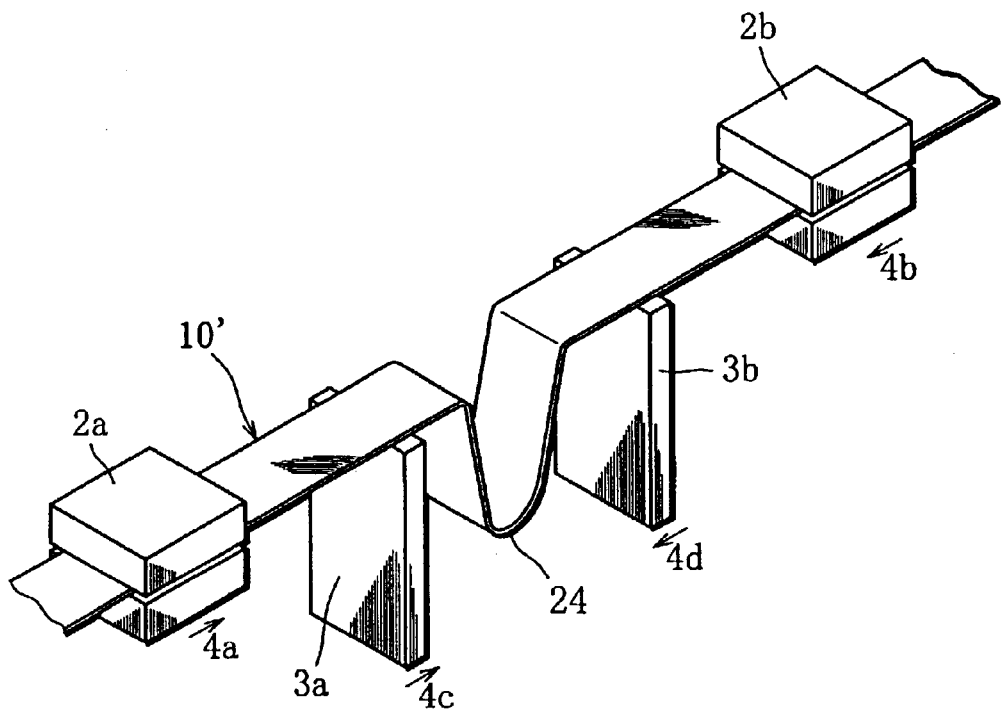
FIGS. 5 to 8 show a folding procedure for forming another flat cable with a projecting portion from the flat strip of FIG. 2 in order.
Figure 6:
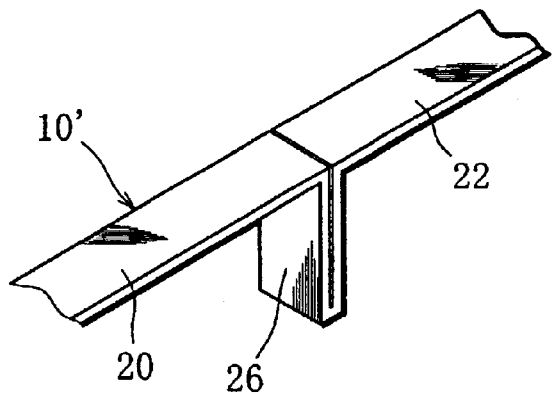

First, the flat strip 10' is held at predetermined two positions by chucks 2a and 2b as shown in FIG. 5. Then, the strip 10' is compressed by moving the chucks 2a and 2b in the directions indicated by arrows 4a and 4b, respectively, so that an U-shaped bent section 24 is formed in the center between the chucks 2a and 2b or a pair of pressure plates 3a and 3b. Next, The pressure plates 3a and 3b are moved in the directions indicated by arrows 4c and 4d, respectively, so as to sandwich the bent section 24 therebetween, whereby pressure is applied to the bent section 24. As a result, as shown in FIG. 6, the bent section 24 forms a lap section 26 raised up at a predetermined position in the strip 10'. The lap section 26 divides the strip 10' in the parts 20 and 22.

Figure 7:
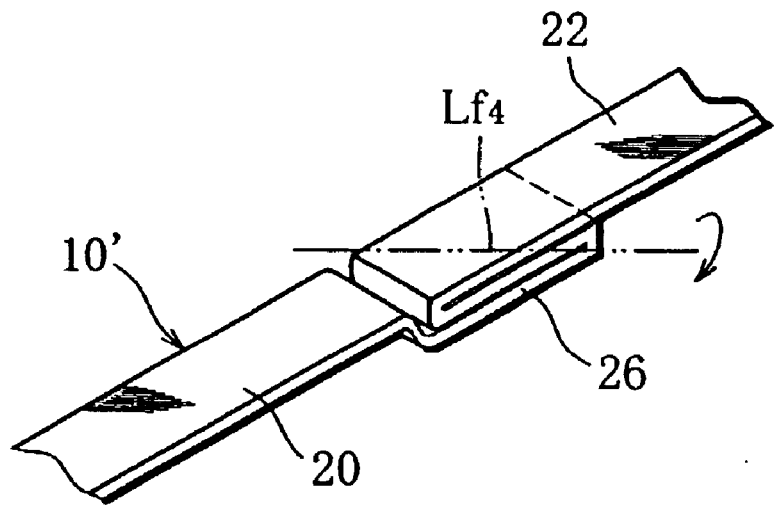

Next, the lap section 26 is folded down in a longitudinal direction of the strip 10' so as to be overlapped on the part 22 as shown in FIG. 7.

Figure 8:
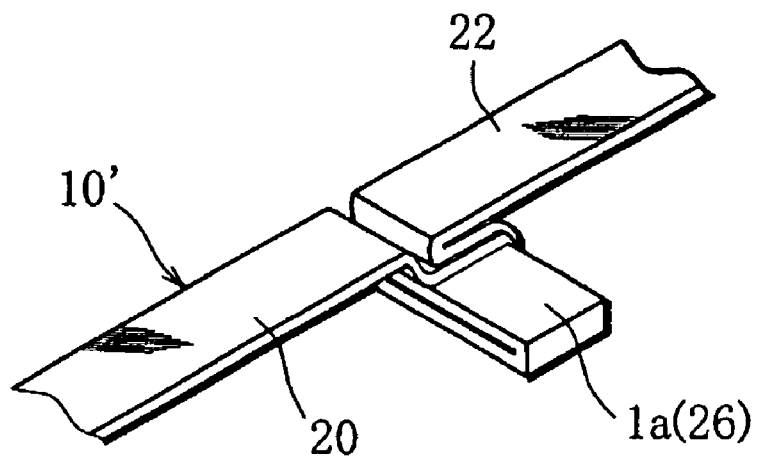

Then, the lap section 26 is folded along a folding line Lf4 as shown in FIG. 7, the folding line Lf4 being at approximately 45° with respect to the longitudinal direction of the strip 10'. Thus, the projecting portion 1a is formed so as to project in the width direction of the strip 10'. As a result, the flat cable 1 with the projecting portion 1a is formed as shown in FIG. 8.

As is apparent from the explanation given above, in the folding procedure of FIGS. 5 to 8 for forming the flat cable 1, a part of the strip 10' is bent at the predetermined position to form the bent section 24. Namely, the spatial expansion required for the automatic processing machine is sufficient for deforming the strip 10' to obtain the bent section 24 and three-dimensionally folding the lap section 26 only. Accordingly, in the folding processing of the strip 10' shown in the order of FIGS. 5 to 8, differing from the case of processing that is carried out in that order of FIGS. 3, 4 and 1. Therefore, the automatic processing machine has no necessity of keeping the large space for forming the flat cable 1. Namely, the easy processing of the strip 10' by means of the automatic processing machine can be maintained, and also the manufacturing cost upon using the machine can be kept low.

Next, explanation will be given of embodiments of laminated cable harnesses according to the present invention with reference to FIGS. 9 to 21.

Figure 9:
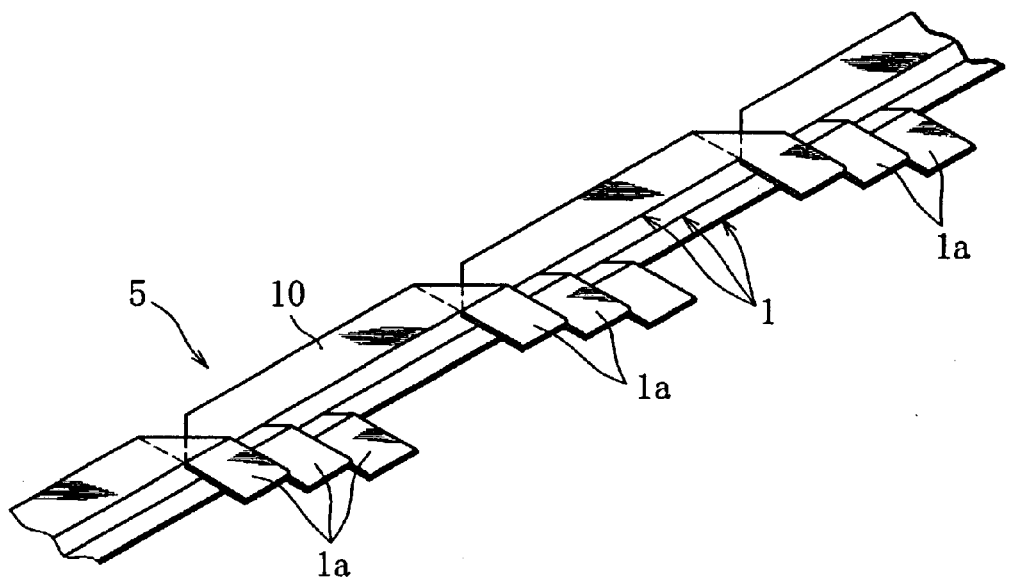
FIG. 9 is a perspective view showing a laminated cable harness according to the present invention, the laminated cable harness including the flat cables of FIG. 1 or 2.
Figure 10:
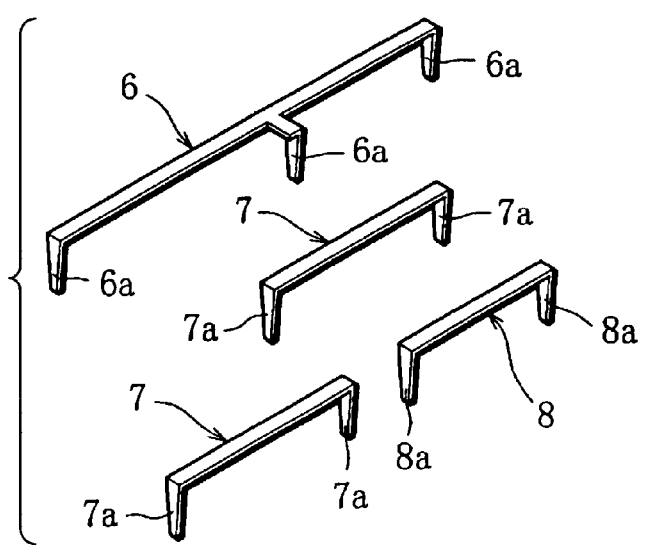
FIG. 10 is a perspective view showing a set of staple-like terminals.

A laminated cable harness 5 is made by laminating the flat cables 1 (3 pieces in the example shown in FIG. 9). Each of the flat cables 1 has a plurality of the projecting portions 1a as shown in FIG. 9, these projecting portion 1a are located at regular intervals in the longitudinal direction of the flat cable 1, for example.

In the laminated cable harness 5, the projecting portions 1a of upper and lower flat cables 1 are grouped in tandem along the longitudinal direction of the harness 5, as shown in FIG. 9. The projecting projections 1a in each of the groups are adjacent to one another, but do not overlap when viewed from the plan view.

The lead wires 1b in the group or adjacent projecting portions 1a of the laminated cable harness 5 are connected by connecting members of conductive material so that branch joints are completed. For example, staple-like terminals 6 to 8 shown in FIG. 10, for example, are used as the connecting members. The adjacent projecting portions 1a can be arbitrarily selected in accordance with the purpose.

The staple-like terminal 6 has three legs 6a at both ends and at a middle portion thereof. Also, the staple-like terminals 7 and 8 have two legs 7a and 8a respectively at both ends thereof. Those legs 6a, 7a and 8a are arranged such that they can electrically connect between any lead wires 1b of adjacent projecting portions 1a.

Figure 11:
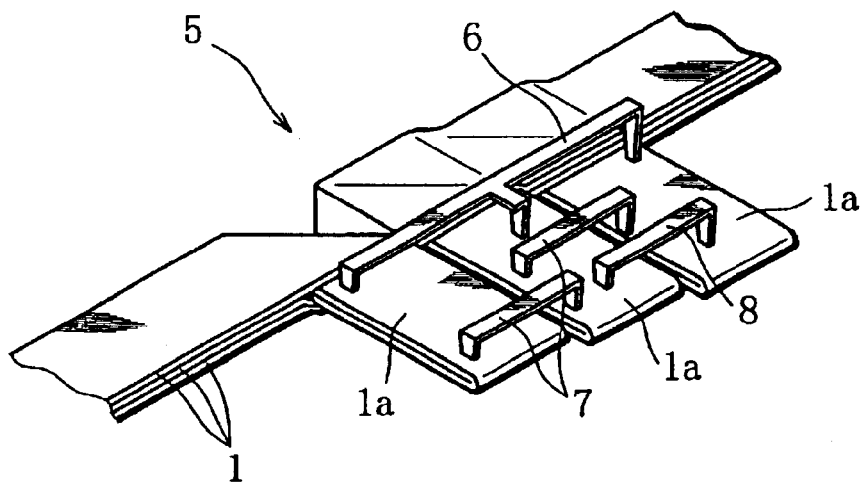
FIG. 11 is a perspective view showing the state where lead wires in the flat cables of the harness are connected with the staple-like terminals.

As shown in FIG. 11, each of the staple-like terminals 6 to 8 spans so as to connect between any lead wires 1b of the adjacent projecting portions 1a of the flat cables 1 in the harness 5. More specifically, the legs of terminals 6 to 8 are mounted on the surfaces of projecting portions 1a, these surfaces being parallel to a main surface of the harness 5, respectively. In this case, each leg of the staple-like terminals is stuck into the synthetic resin 1c of the projecting portions 1a from said surface to the corresponding lead wire 1b, and engaged with that lead wire 1b.

According to the laminated cable harness 5, it is possible to easily make connection between the flat cables 1 or branch-off connection of the flat cables 1, since the projecting portions 1a in the groups of the harness 5 are located adjacent to each other and the staple-like terminals can be used for connection between the lead wires 1b.

Figure 12:
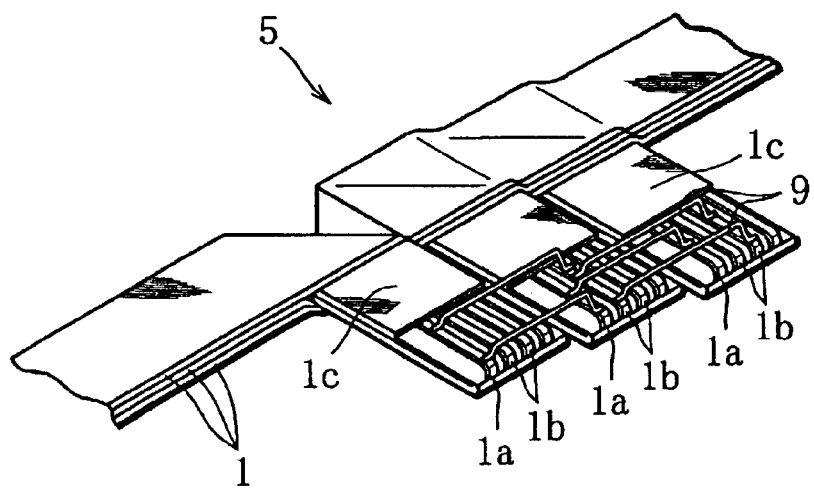
FIG. 12 is a perspective view showing the state where sheaths of the flat cables are partially removed from the projecting portions thereof and the lead wires in the projecting portions are connected with covered wires.

It should be noted that the connection between the lead wires 1b is not limited to the staple-like terminals 6 to 8 as shown in FIG. 11. For example, as shown in FIG. 12, a portion of the synthetic resin 1c or sheath may be removed in the projecting portion 1a and the lead wires 1b may be connected to each other by means of covered wires 9. In case of making the connection using the covered wires 9, since the connecting wires 9 can be cut to make a suitable length for use, it is easy and simple compared to the case where plural kinds of the staple-like terminals of fixed configuration are prepared for use beforehand.

In the laminated cable harness 5 described above, the staple-like terminals, covered wires 9 and lead wires 1b exposed are sealed with an insulator material so as to be electrically insulated for avoiding danger of electric leak, etc., due to contact with other conductive materials and for maintaining safety.

Figure 13:
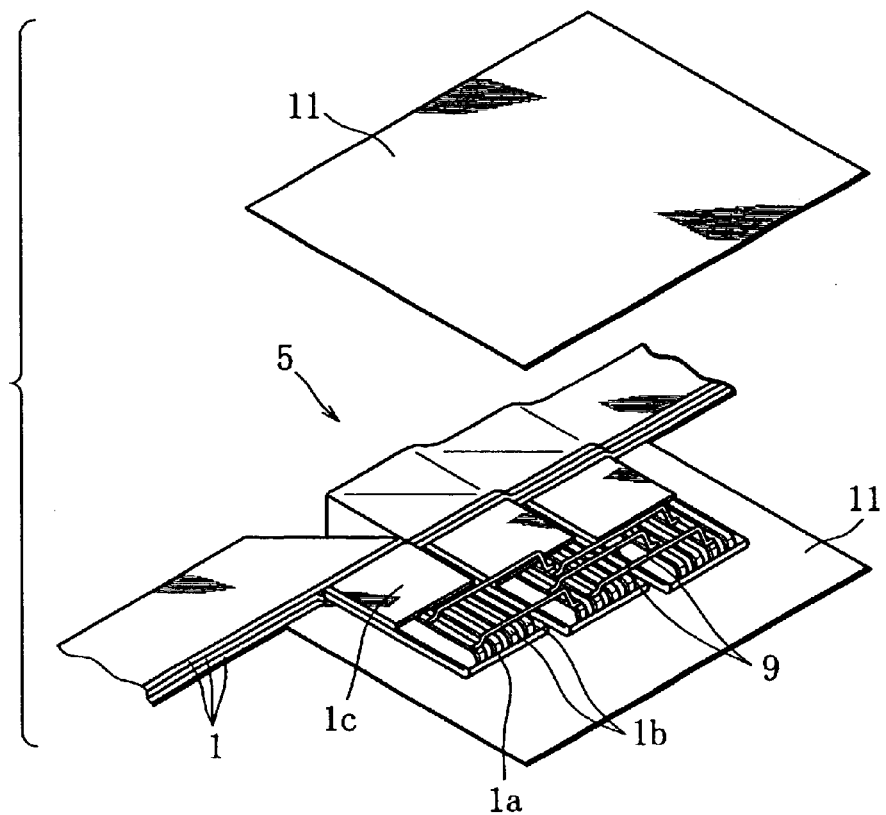
FIGS. 13 to 17 show a procedure for sealing connection between the flat cables of FIG. 12 in order.
Figure 14:
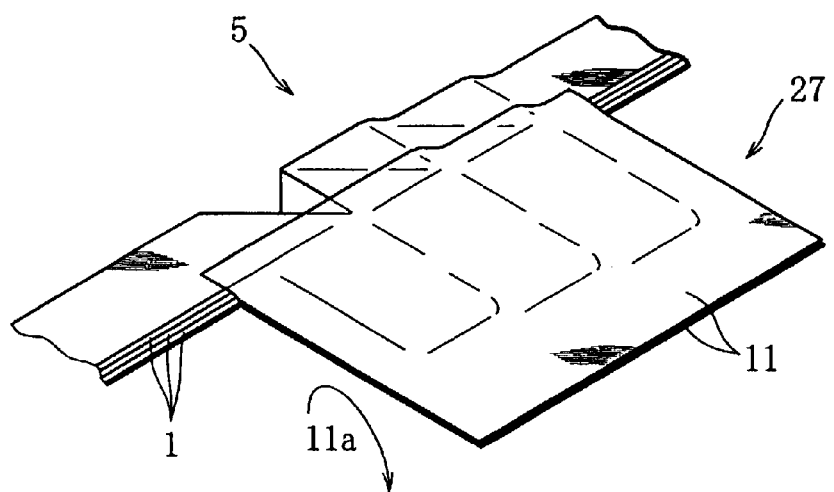

In a case where the connection is made between the lead wires 1b using the covered wires 9, for example, as shown in FIG. 13, a pair of insulating sheets 11 made of cover-lay film may be used to cover the plurality of the projecting portions 1a. As the cover-lay film, a film of polyethylene-terephthalate (PET) or polyimide with an adhesive layer formed thereon is used. The insulating sheets 11 are heated and then bonded to each other so as to cover the projecting portions 1a, as shown in FIG. 14. As a result, a sealed joint 27 including the branch joints is formed on the harness 5.

A single sheet of resin film may be used in place of that pair of insulating sheets 11. The insulating of the covered wires 9 may be secured by covering the projecting portions 1a with the single sheet of resin film folded in two halves, and then bonding the resin film to each other or to the projecting portions 1a with an adhesive.

However, When the projecting portions 1a project in the width direction of the laminated cable harness 5, the sealed joint 27 or the projecting portions 1a sometimes become obstructive, from a viewpoint of using a space within an automobile, depending upon the volume occupied by the projecting portions 1a and/or the way of the projection thereof.

For the efficient use of space within the automobile, it is possible to change the location of the projecting portions 1a on the laminated cable harness 5 in which the projecting portions 1a are projecting in the width direction thereof.

Figure 15:
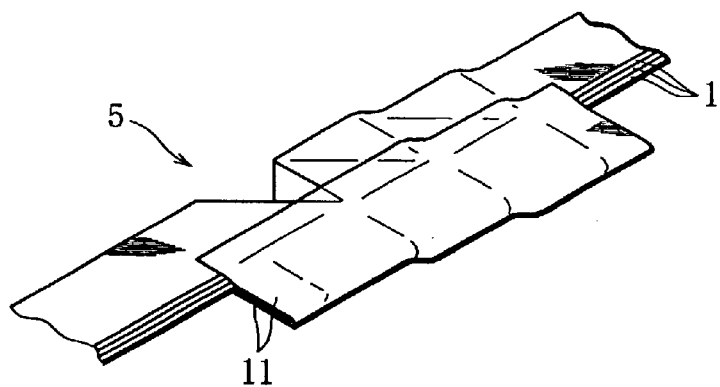

For example, FIG. 14 shows the state where the projecting portions 1a are covered with the insulating sheets 11. Thereafter, the sealed joint 27 or covered projecting portions 1a is folded in the direction indicated by an arrow 11a as shown in FIG. 14 and laid on the lower portion of the flat cable harness 5 as shown in FIG. 15. With this configuration, it is possible to obtain a larger space in the width direction of the laminated cable harness 5.

Figure 16:
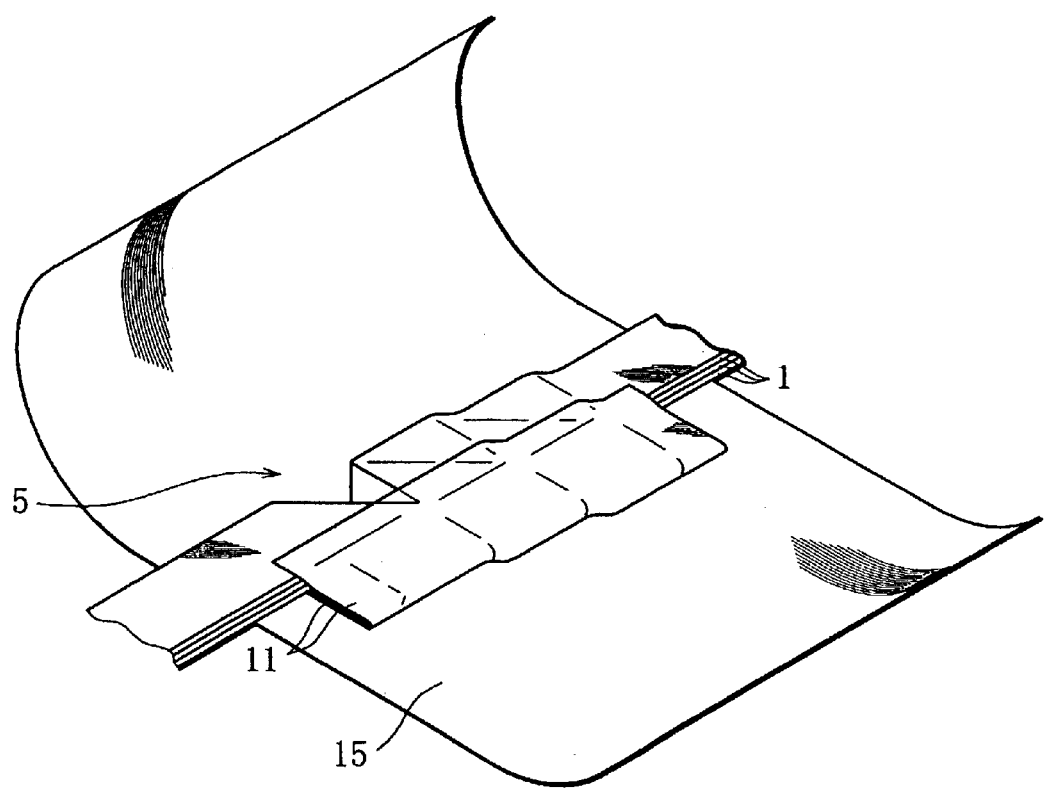
Figure 17:
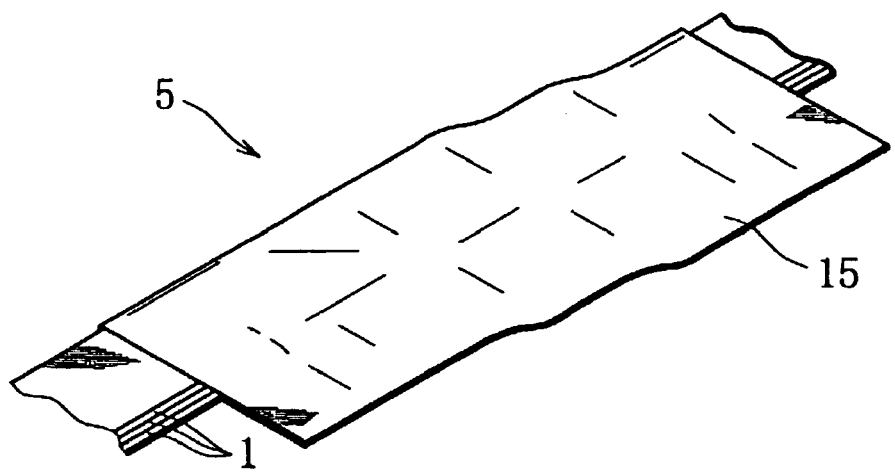

As shown in FIGS. 16 and 17, the folded projecting portions 1a may be further covered and laminated with a fastening sheet 15 made of a tape or tie-wrap together with the harness 5 as a whole, wherein the folded projecting portion 1a is fastened together with the harness 5, and the space occupied by the harness 5 can be kept to be smaller.

Figure 19:
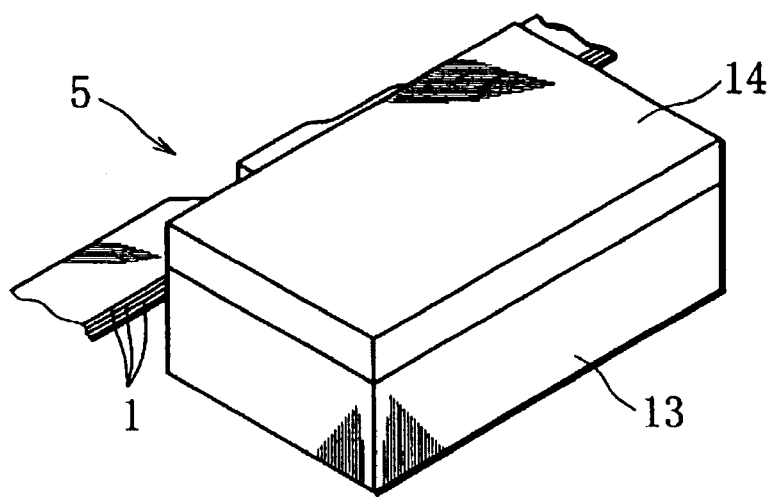
FIGS. 18 and 19 show another procedure for sealing the connection of FIG. 12 in order.
Figure 18:
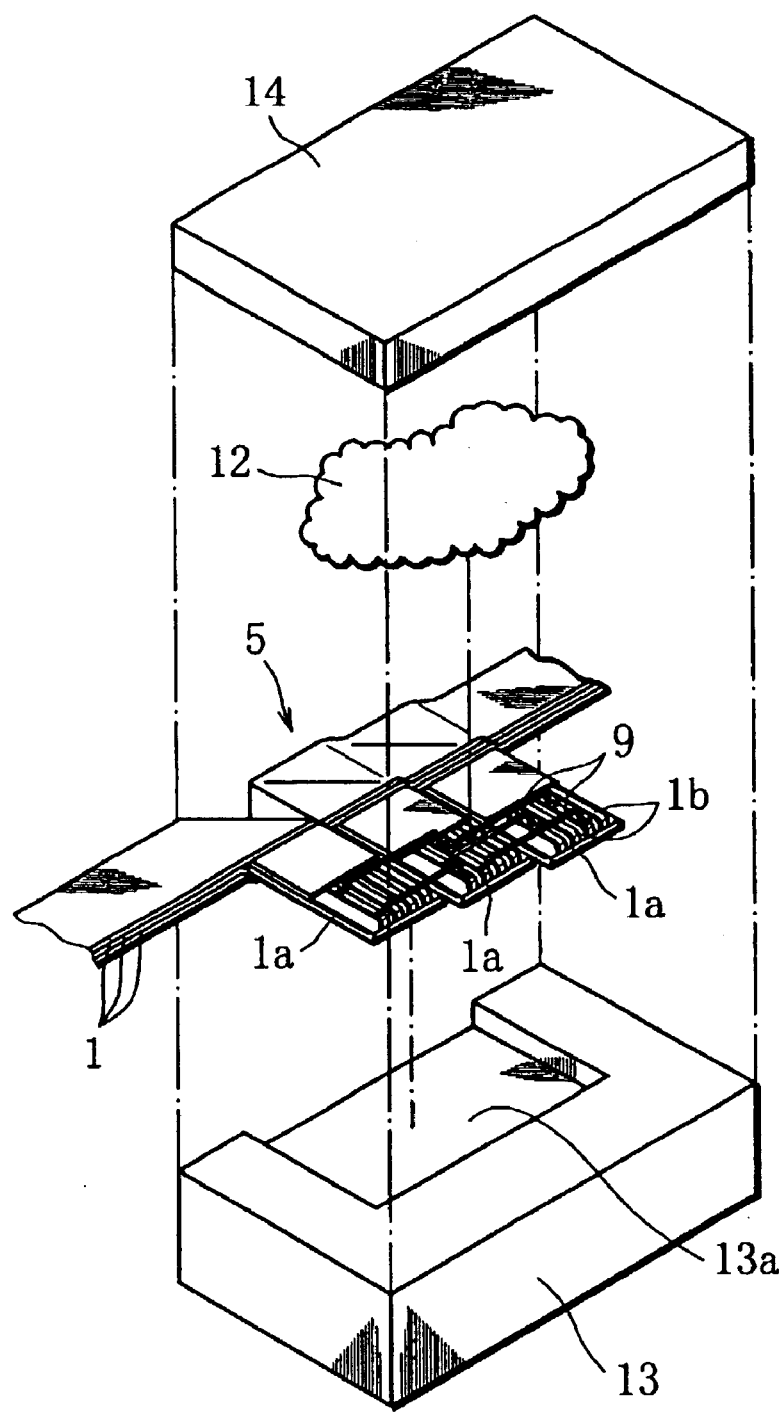

On the other hand, it is possible to employ another sealing wherein different insulation is used from the case of using the insulating sheets or sheet 11. For example, as shown in FIG. 18, first, the lead wires 1b and the covered wires 9 are coated entirely with an insulator material 12 made of a thermoplastic resin. Then, the projecting portions 1a coated with the insulator material 12 are sandwiched between a sealing case 13 having a recess portion 13a formed to receive the projecting portions 1a therein, and a cover plate 14 connected to the sealing case 13. As a result, as shown in FIG. 19, the projecting portions 1a on the laminated cable 5 are covered with the sealing case 13 and the cover plate 14 to be formed in one body. Since the lead wires 1b and the covered wires 9 are covered with the insulator material 12 made of the thermoplastic resin, the insulation thereof can be highly secured. Also, it is possible to obtain the laminated cable harness 5 having the structure, in which the projecting portions 1a are protected by the sealing case 13 and cover 14.

In place of the thermoplastic resin described above, a heat-curable type resist or a photo-resist may be used as the insulator material 12.

Figure 20:
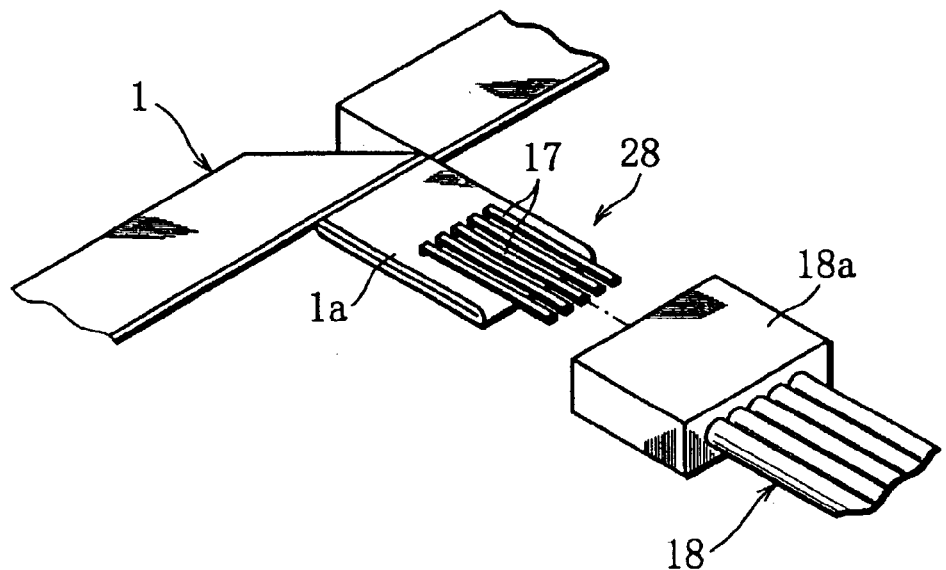
FIG. 20 is a perspective view showing a plug formed by using part of a flat cable, for inserting into a socket of another electric line or cables, the plug having terminals connected to the lead wires of the flat cable.

Also, as shown in FIG. 20, male terminals 17 are attached onto the lead wires 1b of the projecting portion 1a, respectively. The male terminals 17 and the projecting portion 1a cooperate to form a plug 28. On the other hand, a female connector 18a is attached to the end portion of another electric cables or a wire harness 18 for use of branch-off so that the plug 28 can be inserted into the female connector 18a for electrically connecting therebetween. Use of those male terminals 17 or the plug 28 and the female connector 18a for branch-off in this manner enables the laminated cable harness 5 to facilitate branching off in wiring at a desired position on the flat cable 1 or the harness 5.

Figure 21:
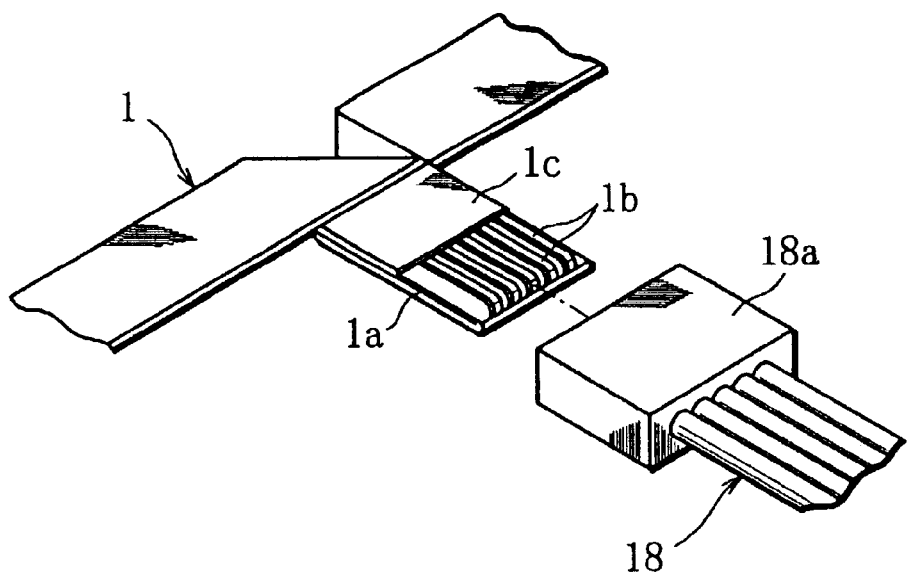
FIG. 21 is a perspective view showing a plug formed by using part of a flat cable, for inserting into a socket of another electric line or cables, the plug having exposed lead wires by means of removal of the sheath of the flat cable.

As shown in FIG. 21, in the laminated cable harness 5, the female connectors 18a may be connected directly to the lead wires 1b, which are exposed through the removal of the synthetic resin 1c in the projecting portion 1a. In this manner, the laminated cable harness 5 can be branched off easily at a desired position on flat cable 1 or the harness 5.

In the embodiments described above, each of the flat cable 1 includes five lead wires 1b therein. Howeber, the number of the lead wires 1a is not limited to that as long as there is at least one.

In the embodiments described above, the corresponding projecting portions 1a of the flat cables 1 do not overlap to each other, but it is not limited to that. Namely, viewed from the plan view of the laminated cable harness 5, each of the adjacent projecting portions 1a may be one on top of the other partly or entirely.

In the embodiments described above, the lead wires 1b in the projecting portions 1a of the flat cables 1 are connected on the main surface side of harness 5 parallel to the flat cables 1 by means of the staple-like terminals or covered bonding wires 9. However, the surface of the projecting portion 1a to be connected is not limited to that one main surface. Namely, in place of the one main surface side, it is possible to use the end face of the projecting portions 1a for connecting the lead wires 9. Alternatively, it is also possible to use both surfaces of the projecting portion 1a for connecting the lead wires 9.

What is claimed is:

1. A laminated cable harness comprising:
   at least three flat cables laminated one on top of the other, each of said flat cables includes:
   a flat strip including a plurality of lead wires extending in parallel with each other along said strip;
   an insulating sheath covering said lead wires; and
   a lap section as a branch joint formed between ends of said strip, said lap section being formed by folding a part of said strip such that two adjacent portions of the folded part are lapped one over the other and project in a width direction of said strip in a plane parallel with a remaining portion of said strip,
   wherein said lap sections of said at least three flat cables are located in tandem along a longitudinal direction of said harness, and
   said harness further comprises a connecting member for electrically connecting at least two lead wires selected from those of said lap sections, respectively.

2. The laminated cable harness according to claim 1, wherein said lead wires each have a flat cross-section.

3. The laminated cable harness according to claim 1, wherein said lap sections of said flat cables do not overlap one another as viewed from a plan view of said harness.

4. The laminated cable harness according to claim 3, wherein said connecting member includes a terminal connected to at least one of said lead wires in said lap section.

5. The laminated cable harness according to claim 3, wherein said harness further comprises an insulating cover for covering said branch joint so as to form a sealed joint.

6. The laminated cable harness according to claim 5, wherein said lap sections including said sealed joint are folded back on said laminated cable harness; and said laminated cable harness further includes a fastening member for bonding said folded lap sections to said harness.

7. The laminated cable harness according to claim 1, wherein said connecting member includes a staple-like terminal.

8. The laminated cable harness according to claim 1, wherein said connecting member includes a covered wire.

9. The laminated cable harness according to claim 1, wherein a part of said sheath is removed so that said lead wires are exposed in said lap section.

10. The laminated cable harness according to claim 1, wherein said connecting member electrically connects selected lead wires from those of said lap sections which are located at opposite ends of said tandem lap sections.

* * * * *